United States Patent
Oswal et al.

(10) Patent No.: US 8,599,792 B2
(45) Date of Patent: Dec. 3, 2013

(54) ROUTING OF CALLS TO CORE NETWORK BASED ON THE LOCATION OF THE FEMTO CELL

(75) Inventors: Anand Oswal, Pune (IN); Anal Srivastava, Pune (IN); Mahavir Karnavat, Pune (IN); Sandeep Gautam, Pune (IN)

(73) Assignee: Cisco Technology, Inc., San Jose, CA (US)

( * ) Notice: Subject to any disclaimer, the term of this patent is extended or adjusted under 35 U.S.C. 154(b) by 868 days.

(21) Appl. No.: 12/564,034

(22) Filed: Sep. 21, 2009

(65) Prior Publication Data

US 2011/0069674 A1  Mar. 24, 2011

(51) Int. Cl.
| | |
|---|---|
| *H04W 80/04* | (2009.01) |
| *H04W 36/18* | (2009.01) |
| *H04W 84/12* | (2009.01) |
| *H04W 84/18* | (2009.01) |
| *H04W 74/00* | (2009.01) |

(52) U.S. Cl.
USPC ............ 370/331; 370/328; 370/338; 455/444

(58) Field of Classification Search
USPC ........................................................ 370/331
See application file for complete search history.

(56) References Cited

U.S. PATENT DOCUMENTS

| | | | | |
|---|---|---|---|---|
| 8,036,665 | B2 * | 10/2011 | Shah ............................. | 455/438 |
| 8,219,100 | B2 * | 7/2012 | Bao et al. ...................... | 370/331 |
| 2005/0148368 | A1 * | 7/2005 | Scheinert et al. ............. | 455/561 |
| 2005/0181805 | A1 * | 8/2005 | Gallagher ................... | 455/456.1 |
| 2005/0186948 | A1 * | 8/2005 | Gallagher et al. .......... | 455/414.1 |
| 2007/0097938 | A1 * | 5/2007 | Nylander et al. ............. | 370/338 |
| 2007/0097939 | A1 * | 5/2007 | Nylander et al. ............. | 370/338 |
| 2007/0123252 | A1 * | 5/2007 | Tronc et al. ................... | 455/427 |
| 2007/0183427 | A1 | 8/2007 | Nylander et al. | |
| 2008/0176582 | A1 | 7/2008 | Ghai et al. | |
| 2008/0298309 | A1 | 12/2008 | DePietro et al. | |
| 2009/0086742 | A1 | 4/2009 | Ghai et al. | |
| 2009/0129341 | A1 | 5/2009 | Balasubramanian et al. | |
| 2009/0141625 | A1 | 6/2009 | Ghai et al. | |
| 2009/0156213 | A1 * | 6/2009 | Spinelli et al. ................ | 455/436 |
| 2009/0196253 | A1 * | 8/2009 | Semper ......................... | 370/331 |
| 2009/0279430 | A1 * | 11/2009 | Huber et al. ................... | 370/328 |
| 2009/0280819 | A1 * | 11/2009 | Brisebois et al. ............. | 455/446 |
| 2009/0285225 | A1 | 11/2009 | Dahod | |
| 2009/0298470 | A1 * | 12/2009 | Huber et al. ................... | 455/411 |
| 2009/0311987 | A1 * | 12/2009 | Edge et al. .................... | 370/310 |
| 2010/0027448 | A1 | 2/2010 | Puthiyandyil et al. | |
| 2010/0039978 | A1 | 2/2010 | Rangan | |
| 2010/0039993 | A1 | 2/2010 | Ramankutty et al. | |
| 2010/0041373 | A1 | 2/2010 | Ramankutty et al. | |
| 2010/0048216 | A1 * | 2/2010 | Sundarraman et al. ........ | 455/444 |
| 2010/0077102 | A1 * | 3/2010 | Lim et al. ...................... | 709/240 |

(Continued)

OTHER PUBLICATIONS

U.S. Appl. No. 61/177,491, filed May 12, 2009.

*Primary Examiner* — Ian N Moore
*Assistant Examiner* — Jenee Alexander
(74) *Attorney, Agent, or Firm* — Wilmer Cutler Pickering Hale and Dorr LLP

(57) ABSTRACT

A femto gateway maintains information about the location of femto cells and areas served by mobile switching centers. The gateway maintains a mapping so that it selects a desired mobile switching center (MSC) and SGSN that is likely to be used if the user equipment leaves the coverage area of the femto cell and enters a macro cell or vice versa.

18 Claims, 3 Drawing Sheets

(56) References Cited

U.S. PATENT DOCUMENTS

2010/0085978 A1 4/2010 Ramankutty et al.
2010/0091653 A1 4/2010 Koodli et al.
2010/0203890 A1* 8/2010 Nagaraja et al. .............. 455/436

* cited by examiner

ROUTING OF CALLS TO CORE NETWORK BASED ON THE LOCATION OF THE FEMTO CELL

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

The first generation of wireless telephone technology used analog mobile phones in which analog information signals were modulated and transmitted. In a second generation (2G) system, digital information signals were used to modulate a carrier. These 2G technologies used time division multiplex access (TDMA) technology for GSM systems, or code division multiple access (CDMA) technologies for IS-95 to distinguish multiple users. Such networks were further upgraded to handle higher-speed packet data using GPRS/EDGE and then HSPA, and CDMA 1x-EVDO in networks referred to as 2.5G and 3G networks. The next evolution is 4G technology, which is referred to as long term evolution-system architecture evolution (LTE-SAE) and uses orthogonal frequency division multiple access (OFDMA) technology. Other wireless protocols have also developed including WiFi (an implementation of various IEEE 802.11 protocols), WiMAX (an implementation of IEEE 802.16), and HiperMAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. A macro cell transceiver is typically used by service providers to provide coverage over about a five kilometer distance. A pico cell transceiver can provide coverage over about a half kilometer distance, and a femto cell transceiver can provide coverage over a 50-200 meter distance. A femto cell transceiver is similar in coverage to a WiFi (WLAN) access point and can be used to provide network access over a short range.

SUMMARY

Multiple mobile switching centers (MSCs) and service nodes in an operator's core network can connect to the same femto gateway (GW). This means that an individual could have a femto cell with a microcellular coverage area that is adjacent to macro cellular coverage areas, and yet be served by different MSCs and serving nodes. If the UE moves from the femto cell's microcellular coverage area to the macro network, it would be desirable to have an intra-MSC handover, or for the anchoring SGSN to remain the same. This can be achieved if the same MSC and SGSN is selected for both cases, i.e., when the call is initiated/terminated in a femto cell microcellular area or when the call is originated/terminated in a traditional macro cellular area.

To achieve this, the MSC and SGSN used for the femto cell by the femto GW are the same as the ones that would be used in case a macro cell were providing coverage. Most commonly, areas that are adjacent geographically are served by the same MSC and serving node. Using this assumption, and based on the geographic location of femto cell and/or the local area code/routing area code (LAC/RAC) associated with the femto cell, the femto GW can select an appropriate MSC and SGSN that would most likely also serve the macro cells that neighbor the femto cell. This selection would help ensure that only an intra-MSC handover happens when the UE moves from femto cell coverage area to macro coverage area. Both the LAC/RAC of the femto cell, as well as its precise geographical location, are available at the femto GW and can be utilized for selecting the MSC/SGSN at the time of UE registration itself.

Other features and advantages will become apparent from the following detailed description, drawing, and claims.

DESCRIPTION

Systems and methods for handovers between microcellular/femto radio access networks (RANs) and macro cellular RANs are provided. The selection of the network device such as a mobile switching center (MSC) at the femto GW along with the optimized routing of voice/data bearers and signaling reduces handovers and reduces the number of handovers that are not intra-MSC. The benefit of keeping the network device such as the MSC the same in a handover from the femto RAN to the macro RAN is that the handover is more seamless because the network device is prepared to continue handling the call or session of the user equipment (UE).

Figure 1:
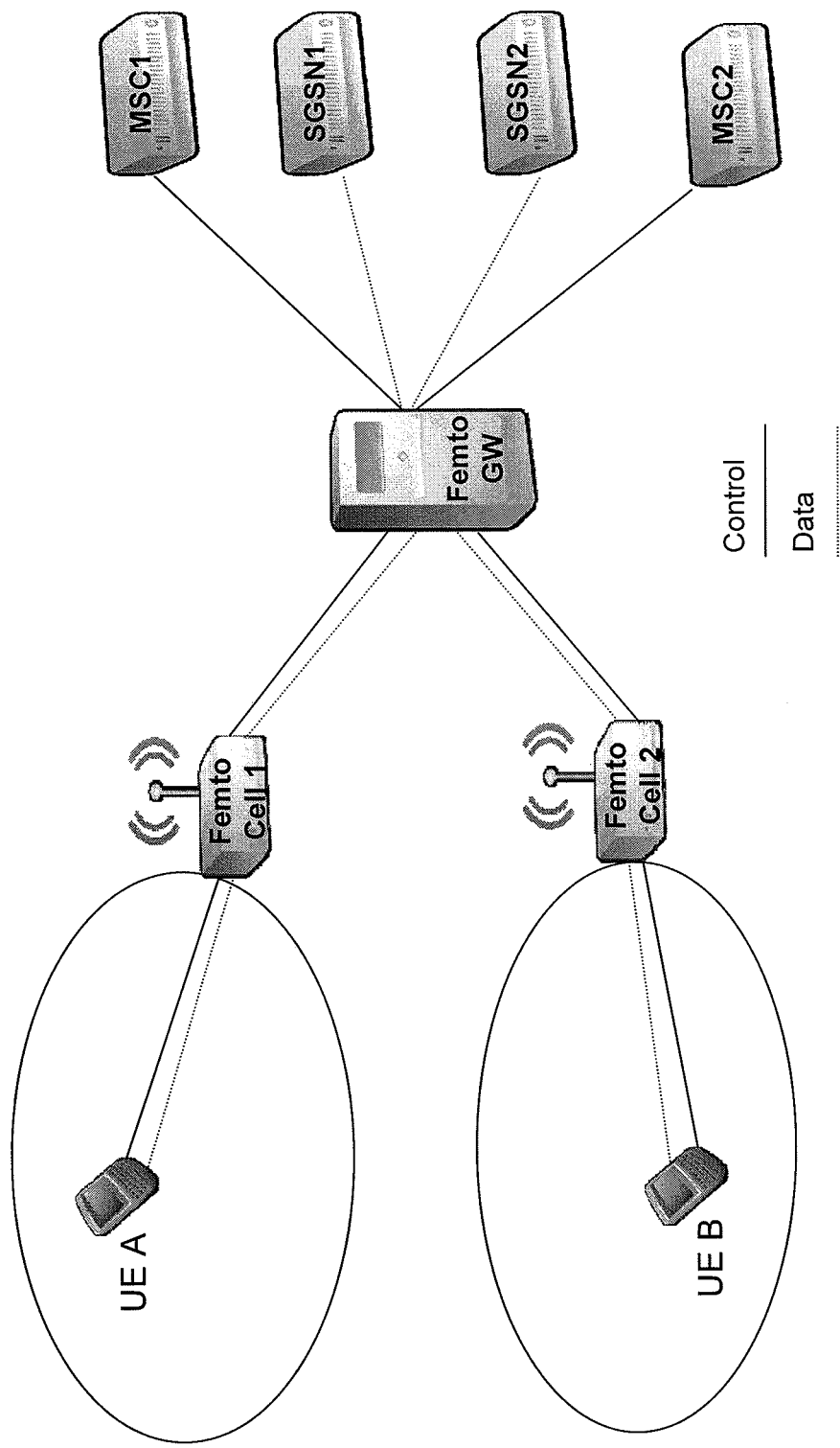
FIG. 1 is a block diagram of a femto cell system.

Referring to FIG. 1, the femto network has a femto cell 1 with a microcellular coverage area in which there is user equipment (UE) A, and a femto cell 2 with a coverage area in which there is user equipment (UE) B. Both femto cells communicate with a femto gateway, which, in turn, can communicate with one of a plurality of MSCs and serving nodes, such as Serving GPRS Support Nodes (SGSNs).

In operation, femto cell 1 sends a femto cell registration request to a femto GW including the local area code/routing area code (LAC/RAC) and geographical location of femto cell 1. The femto GW stores the LAC/RAC and geographical location of femto cell 1, while successfully registering femto cell 1.

The femto gateway can use the LAC/RAC and geographical location (e.g., cell ID or GPS location) of femto cell 1 to create a mapping between the LAC/RAC and geographical location of the femto cells and the MSC/SGSN that should serve them. This mapping is based on the femto cell's relative geographic location compared to the geographical location of nearby macro cellular neighborhoods. A logic can be used to determine the likely network device to handle the user equipment if the user equipment were to move from the femto network to a nearby macro cellular network. The logic can be computer code that is stored in a computer readable medium and processed by a network processing unit (e.g., an integrated circuit) on the femto gateway. The logic can compare the relative location information of the femto cell and the location information of the nearby macro cells in order to determine the network device serving the macro cells. The geographical mapping can be implemented using a local configuration on the femto gateway or a Home NodeB Management System (HMS) interface. The femto architecture is further described in U.S. Patent Publication US 2009/0156213, entitled "Interworking Gateway for Mobile Nodes", which is hereby incorporated by reference herein in its entirety.

Figure 2:
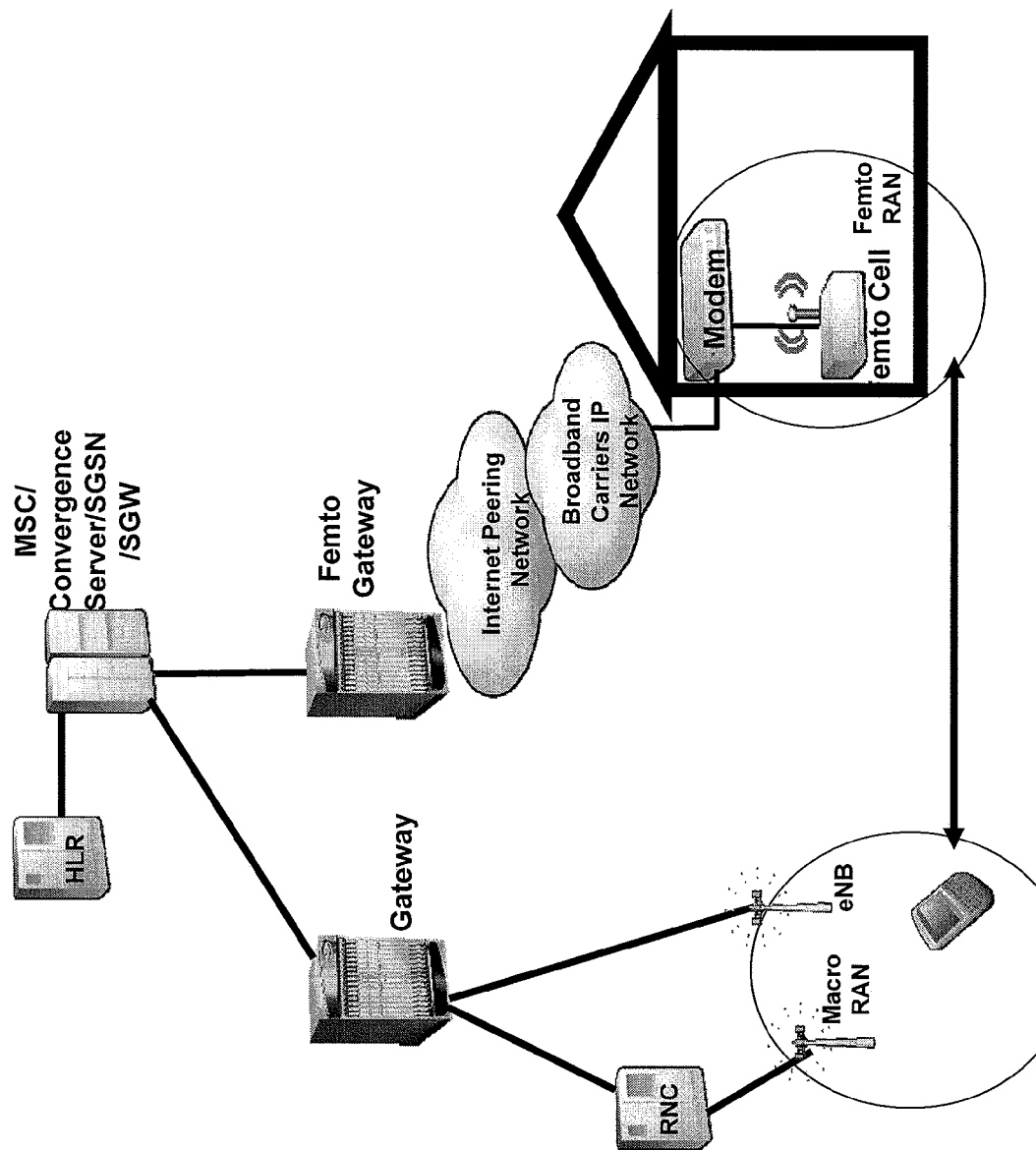
FIG. 2 is a block diagram of an intra-network device handover.

FIG. 2 illustrates the situation where a handover occurs between the femto access network and the macro access network in accordance with certain embodiments. As shown, the femto RAN includes a femto cell which connects to a modem and uses broadband IP network to communicate with the femto gateway. The use of a broadband network for connecting between the femto cell and the femto gateway can cause the femto gateway to be in a very different geographical location than the network device that the femto gateway connects to for core network access. The network device can be a MSC, a convergence server, a SGSN, a serving gateway (SGW), a home agent, or any other device. The macro RAN can include a base transceiver station (BTS), a NodeB, an eNodeB, or any other applicable access network device. The macro RAN can communicate with a gateway, which can be an access gateway, a packet data network gateway (PGW), a gateway GPRS support node (GGSN), a packet data serving node (PDSN) or any other access device. In some embodiments, the femto gateway and the gateway can be implemented on the same chassis or platform, such as Starent Networks, Corp.'s ST40 platform.

The mapping function can also be used in the gateway for UE's that are femto subscribers, or that use femto access networks. In such embodiments, the UE can provide an indication in messaging to the gateway that it uses femto cells. This indication can then trigger mapping to occur on the gateway to select a network device that can be the same as the network device selected by the femto gateway used by the UE.

When UE A enters the coverage area of femto cell 1, UE A makes a location update to femto cell 1 and then to the femto gateway. The femto gateway, by using the mapping and the location information obtained previously, can decide intelligently to route the location update to a network device (e.g., an MSC). By doing so, the femto gateway can select a MSC that would most likely be the same as the MSC serving the UE in the macro neighborhood near the microcellular area, and therefore, would likely serve the UE again if the UE moves out of the femto cell area to a location where it would be served by a macro network. Once the desired MSC gets the location update, it would be the serving MSC for terminating calls to that UE.

Figure 3:
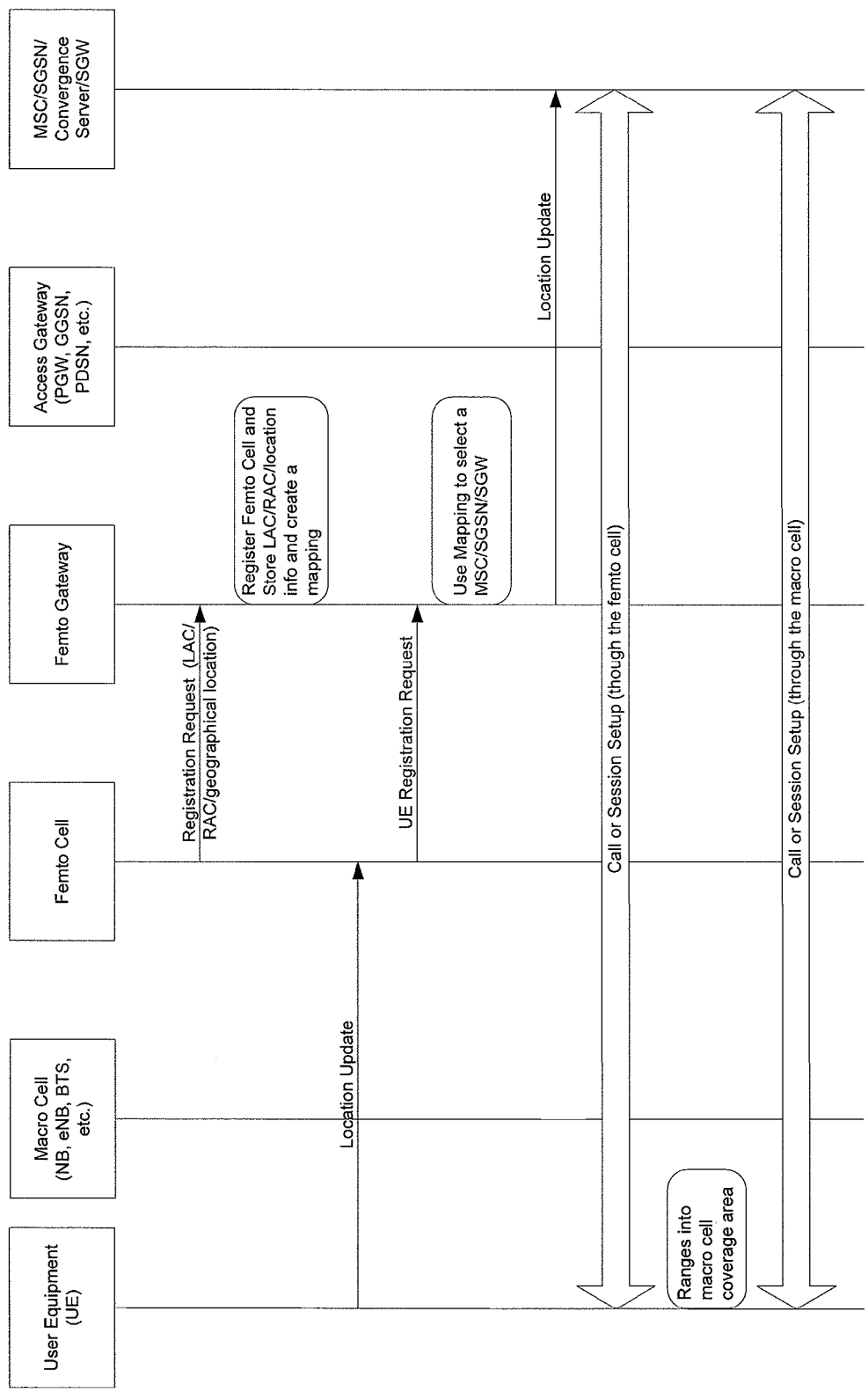
FIG. 3 is a call flow of an intra-network device handover.

FIG. 3 illustrates a call flow for a handover from a femto access network to a macro access network in accordance with some embodiments. As shown, the femto cell sends a registration request including certain information such as the LAC/RAC/geographical location to the femto gateway. This information is stored and used to create a mapping to select a network device that would likely serve the UE in a nearby macro RAN. The UE upon ranging into the femto cell coverage area sends a location update to the femto cell, which sends a UE registration request to the femto gateway. Using the mapping in the femto gateway, the location update can be sent to the network device most likely to be involved in a handover from the femto cell. Once the network device has been determined at the femto gateway a location update can be sent to this network device, which can be selected depending on the capabilities of the UE. For example, a UE that is capable of 4G communication can have a corresponding SGW selected for anchoring the session and for communication to the IP core network. When the UE ranges into the macro cell coverage area, call or session setup can be through the macro cell and the handover can be using the same network device as was previously selected by the femto gateway.

For a mobile originated call, the UE-initiated network access storage (NAS) messages would be routed to the correct MSC/SGSN similar to the location update message. The same holds true for UE B, which, when registering with femto cell 2, would be routed to a different MSC/SGSN.

Other embodiments are within the following claims. For example, the femto cell could serve a number of different UEs.

What is claimed:

1. An apparatus comprising:
    a femto gateway configured to communicate with a femto cell and a plurality of mobile switching centers, wherein the femto gateway is further configured to:
        receive a registration request from the femto cell, wherein the registration request includes information indicative of geographical location of the femto cell, and wherein the femto cell is in communication with a user equipment,
        determine, based on the information indicative of geographical location of the femto cell and information indicative of the plurality of mobile switching centers, one of the plurality of mobile switching centers that would likely serve the user equipment in case the user equipment moves to a macro cellular network;
        maintain a mapping between the femto cell and the one of the mobile switching centers, and
        responsive to a request for service from the user equipment received via the femto cell, cause the user equipment to communicate with the one of the plurality of mobile switching centers.

2. The apparatus of claim 1, wherein the registration request further includes a local area code or a routing area code of the femto cell, and wherein the femto gateway is further configured to use the local area code or the routing area code to determine the one of the plurality of mobile switching centers.

3. The apparatus of claim 1, wherein the gateway is configured to maintain the mapping between the femto cell and the one of the mobile switching centers using a local configuration of the femto gateway.

4. The apparatus of claim 1, wherein the gateway is configured to maintain the mapping between the femto cell and the one of the mobile switching centers using a Home NodeB Management System (HMS) interface.

5. A method for use by a femto gateway comprising:
    receiving, at the femto gateway from a femto cell, registration information including geographical location information of the femto cell, wherein the femto cell is in communication with a user equipment;
    maintaining, at the gateway, information about locations of a plurality of mobile switching centers with which the gateway can communicate;
    determining, based on the geographical location information of the femto cell and the information about locations of the plurality of mobile switching centers, one of the plurality of mobile switching centers that is likely to serve the user equipment if the user equipment moves from the femto cell to a macro cellular network; and
    maintaining a mapping between the femto cell and the one of the mobile switching centers; and
    responsive to a request for service from the user equipment received via the femto cell, causing the one of the plurality of mobile switching centers to communicate with the user equipment.

6. The method of claim 5, wherein the femto cell registration information further includes a local area code or a routing area code of the femto cell, and wherein determining the one of the plurality of mobile switching centers further includes determining the one of the plurality of mobile switching centers based on the local area code or the routing area code of the femto cell, the geographical location information of the femto cell, and the information about locations of the plurality of mobile switching centers.

7. The method of claim 5, wherein the geographical location information of the femto cell includes a global positioning system (GPS) location information.

8. The method of claim 5, wherein the geographical location information of the femto cell includes a cell identification of the femto cell.

9. The method of claim 5, wherein causing the one of the plurality of mobile switching centers to communicate with the user equipment includes forwarding a location update message received from the user equipment to the one of the plurality of mobile switching centers.

10. The method of claim 5, wherein maintaining the mapping between the femto cell and the one of the plurality of mobile switching centers includes maintaining the mapping between the femto cell and the one of the mobile switching centers using a local configuration of the femto gateway.

11. The method of claim 5, wherein maintaining the mapping between the femto cell and the one of the plurality of mobile switching centers includes maintaining the mapping between the femto cell and the one of the plurality of mobile switching centers using a Home NodeB Management System (HMS) interface.

12. Logic encoded on one or more non-transitory media for execution and when executed operable to:
  receive, at a femto gateway from a femto cell, registration information including geographical location information of the femto cell, wherein the femto cell is in communication with a user equipment;
  maintain information about locations of a plurality of mobile switching centers with which the gateway can communicate;
  determine, based on the geographical location information of the femto cell and the information about locations of the plurality of mobile switching centers, one of the plurality of mobile switching centers that is likely to serve the user equipment if the user equipment moves from the femto cell to a macro cellular network; and
  responsive to a request for service from the user equipment received via the femto cell, cause the one of the plurality of mobile switching centers to communicate with the user equipment.

13. The logic of claim 12, wherein the registration information further includes a local area code or a routing area code of the femto cell, and wherein the logic is further operable to determine the one of the plurality of mobile switching centers based on the local area code or the routing area code of the femto cell, the geographical location information of the femto cell, and the information about locations of the plurality of mobile switching centers.

14. The logic of claim 12, wherein the logic operable to cause the one of the plurality of mobile switching centers to communicate with the user equipment includes logic operable to forward a location update message, received from the user equipment, the one of the plurality of mobile switching centers.

15. The logic of claim 12, further comprising logic operable to maintain a mapping between the femto cell and the one of the mobile switching centers.

16. The logic of claim 15, wherein the logic is operable to maintain the mapping between the femto cell and the one of the plurality of mobile switching centers using a Home NodeB Management System (HMS) interface.

17. The logic of claim 15, wherein the logic is operable to maintain the mapping between the femto cell and the one of the plurality of mobile switching centers using a local configuration maintained at the femto gateway.

18. The logic of claim 12, wherein the geographical location information of the femto cell includes a cell identification of the femto cell.

* * * * *